United States Patent [19] [11] 4,174,004
Ramsbottom et al. [45] Nov. 13, 1979

[54] ELECTRIC STORAGE BATTERIES

[75] Inventors: Edgar Ramsbottom, Bolton; William Whalley, Altrincham; Edmund Bale, Brooklands, all of England

[73] Assignee: Chloride Group Limited, London, England

[21] Appl. No.: 877,383

[22] Filed: Feb. 13, 1978

[30] Foreign Application Priority Data

Feb. 15, 1977 [GB] United Kingdom ............... 6260/77

[51] Int. Cl.² ............................................. H01M 7/00
[52] U.S. Cl. ....................................... 141/32; 141/82; 141/121; 141/155; 141/284; 271/3.1; 414/35
[58] Field of Search ................... 141/1.1, 32, 33, 115, 141/121, 125, 131, 155, 183, 190, 191, 270, 283, 284, 324, 378, 82; 214/6 TS; 271/3.1, 35; 432/121, 133

[56] References Cited

U.S. PATENT DOCUMENTS

| 1,975,039 | 9/1934 | Goodrich et al. ............... 141/32 |
| 3,416,778 | 12/1968 | Chabaglian ............... 432/133 X |
| 3,776,544 | 12/1973 | Watson et al. ............... 271/3.1 |
| 4,050,482 | 9/1977 | Ching et al. ............... 141/32 X |

Primary Examiner—Frederick R. Schmidt
Attorney, Agent, or Firm—Oblon, Fisher, Spivak, McClelland & Maier

[57] ABSTRACT

There is disclosed a plant for pasting battery plates comprising a pasting machine comprising a flat conveyor belt and paste applying means for forcing paste into a grid conveyed on the conveyor past the said paste applying means, grid feeding means, and a transportable hopper and mechanical discharge means for mechanically discharging paste into the inlet to the pasting machine, paste recycling means adapted to mechanically collect paste applied to the conveyor and to convey it back to the inlet to the pasting machine, and a drying oven.

14 Claims, 7 Drawing Figures

ELECTRIC STORAGE BATTERIES

BACKGROUND OF THE INVENTION

1. Field of the Invention

The present invention relates to a method for making pasted flat grid battery plates, especially lead acid electric storage battery plates, and to plant and apparatus for carrying out the method.

2. Description of the Prior Art

Conventional pasting plant involves a high degree of manual labour and a considerable risk of loss of valuable lead oxide active material quite apart from environmental disadvantages. The productivity of the process is limited by its high content of manual labour.

The present invention is concerned with providing a plant in which active material paste is transported from a mixer and discharged mechanically into a pasting machine hopper, the grids are fed mechanically more rapidly to the pasting machine than hitherto, the paste which is applied between plates on the conveyor being recovered and returned to the pasting machine hopper input and the plates being dried more efficiently than hitherto.

Thus according to the present invention the plant for pasting battery plates comprises a pasting machine comprising a flat conveyor belt and paste applying means for forcing paste into a grid conveyed on the conveyor past the paste applying means, grid feeding means, and a transportable hopper and mechanical discharge means for mechanically discharging paste into the inlet to the pasting machine, paste recycling means adapted to mechanically collect paste applied to the conveyor and to convey it back to the inlet to the pasting machine, and a drying oven.

The invention also extends to the transportable hopper and portable paste dispensing machine on its own. This preferably comprises a gated base, which when opened places an upper storage region into communication with outfeed conveyor means which when driven, e.g. by a motor mounted on the hopper conveys paste towards one edge of the hopper and feeds it to a transverse conveyor which, when driven, e.g. by the same or a different motor mounted on the hopper, conveys the paste to a discharge outlet. The gated base preferably consists of a pair of doors hinged to opposite sides of the hopper and meeting at the middle, so positioned above the outfeed conveyor means that they can hang down vertically when open. The inside surfaces of the hopper and paste dispensing machine are preferably lined with stainless steel coated with P.T.F.E. to reduce paste adhesion.

The outfeed conveyors preferably consist of two or more, e.g. four, screw conveyors extending across the full width of the base of the hopper. The transverse conveyor is preferably also a screw conveyor. We have found that with leady oxide/sulphuric acid battery paste it is preferable that the angle of the flights to the longitudinal axis of the conveyor should be at least 22°. The pitch is preferably at least 80% of the diameter e.g. 80% to 120% of the screw.

The invention also extends to the grid feeding means themselves. These preferably comprise a continuously movable driven horizontal chain conveyor having upstanding bars or flights extending across it. These bars or flights may be adjustable for both height above the surface of the conveyor and spacing along the conveyor.

The grid feeding means also comprises a grid storage station and grid transfer means. The grid feeding means operate as follows. A feed stack of, for example, up to twenty grids is located at the grid storage station. The conveyor and grid transfer means are then switched on. The conveyor slides one grid at a time from the bottom of the feed stack by the flights engaging one grid at a time. The contents drop to a predetermined height, e.g. the thickness of eight of the thickest grids which will be used with the machine. When, for example, only eight grids remain the grid transfer means is actuated and removes sufficient plates from the bottom of the storage stack to make the feed stack up to twenty again, and transfers these plates, twelve in this illustration, to the top of the feed stack. The number of plates which can be used in the feed stack depends on their individual weight and thickness and thus, upon the frictional force between the bottom plate in the stack and the one above it. Clearly if this exceeds a certain value even feeding of the grids will be interfered with and jamming of the pasting machine may occur.

The grid feeding mechanism in one preferred form comprises a storage surface over which a grid selector block, adjustable for thickness, is arranged to move reciprocably, adjustable storage magazine defining members positioned above the storage surface and over the path of the grid selector block, a feed magazine separated from the storage magazine by an adjustable stop plate, the gap between the bottom of the stop plate and the storage surface being arranged to be the same as the thickness of the grid selector block, a feed conveyor extending along the bottom of the feed magazine, the bottom of the feed magazine being positioned at a lower level than the storage surface, the distance between the bottom of the feed magazine and the storage surface preferably being less than the distance between the storage surface and the bottom of the stop plate, and the feed conveyor carrying spaced transverse flights being adapted to engage the bottom grid in the feed magazine and convey it out of the feed magazine beneath an adjustable end plate.

The feed conveyor is preferably a chain conveyor each side chain being supported in cages to minimize rocking of the flights when they engage a grid.

The invention also extends to the paste recycling means on their own.

It will be appreciated the plates on the conveyor will be spaced a small distance apart and that the pasting machine applies paste continuously to the conveyor. When a grid is below the pasting machine, the paste adheres to the grid but a transverse ribbon of paste will adhere to the conveyor between each plate.

The paste recycling means comprises a collector for these ribbons which may be a hopper into which the paste falls under gravity during the return path of the conveyor and may also include a scraper to achieve or assist in removal of the ribbon of paste from the conveyor.

The paste is preferably fed from the bottom of the hopper by paddles which feed the paste into a lower chamber which has a screw which feeds the paste into a pumping chamber which then pumps the paste slowly back to the inlet of the hopper of the pasting machine. The pumping chamber is preferably of the monopump type. We have found that slow very low pressure pumping is most effective and the pressure applied to the paste should not exceed 20 p.s.i.g., e.g. in the range 8–15 p.s.i.g. The screw of the lower chamber is preferably directly connected to the rotor in the second chamber. It should preferably be such as to overfeed the second rotor by at least 5–15%, e.g. 10%.

The lower chamber preferably contains a screw conveyor directly connected to the rotor of a monopump. The paddles in the hopper are also preferably disposed on either side of the vertical centre line of the hopper, intermesh with each other and are driven so as to rotate towards each other forcing paste down between them. The hopper further preferably has an upper portion with inwardly converging ends but outwardly diverging sides and a lower portion with vertical ends and inwardly converging sides which connect smoothly to the side walls of a horizontal round bottomed chamber in which the screw rotates.

The paddles are preferably located in the upper end of the lower portion of the hopper, one paddle being higher than the other and having a larger diameter.

The pump motors are preferably interlocked with the conveyor motor so that no pumping can occur unless the conveyor is moving.

The pump motors are preferably also interlocked with the position of the pasting machine hopper so that if the hopper is swung up away from its operating position the pumps again cannot be operated.

The whole unit is preferably interlocked with a flushing system to enable it to be cleansed after use. This can be done by running the pumps at high speed and the interlock may be an automatic one.

The invention also extends to the drying oven in itself. The drying oven preferably incorporates convection heating means, radiative heating means and a perforate heat resistant conveyor. The convection heating minus are located below the conveyor and may be one or more rows of gas burners extending along the length of the conveyor. The radiative means extend along the length of and above the conveyor. The radiative means are preferably also gas fired and have a longitudinally extending central burner space and transverse ceramic fins extending outwardly and downwardly from the burner space. The fins are narrow and are spaced from each other by about the thickness of one fin. The ratio of the distance between the furthest outside edges of a pair of fins to the thickness of each fin is preferably in the range 50:1 to 30:1 e.g. 38:1. The flames thus pass through the gaps between the fins and heat them to radiation temperatures.

BRIEF DESCRIPTION OF THE DRAWINGS

The invention may be put into practice in various ways and one specific embodiment will be described by way of example with reference to the accompanying drawings in which.

DETAILED DESCRIPTION OF THE PREFERRED EMBODIMENTS

The general arrangement of the plant will first be described with reference to FIGS. 2, 3 and 5.

Figure 1:
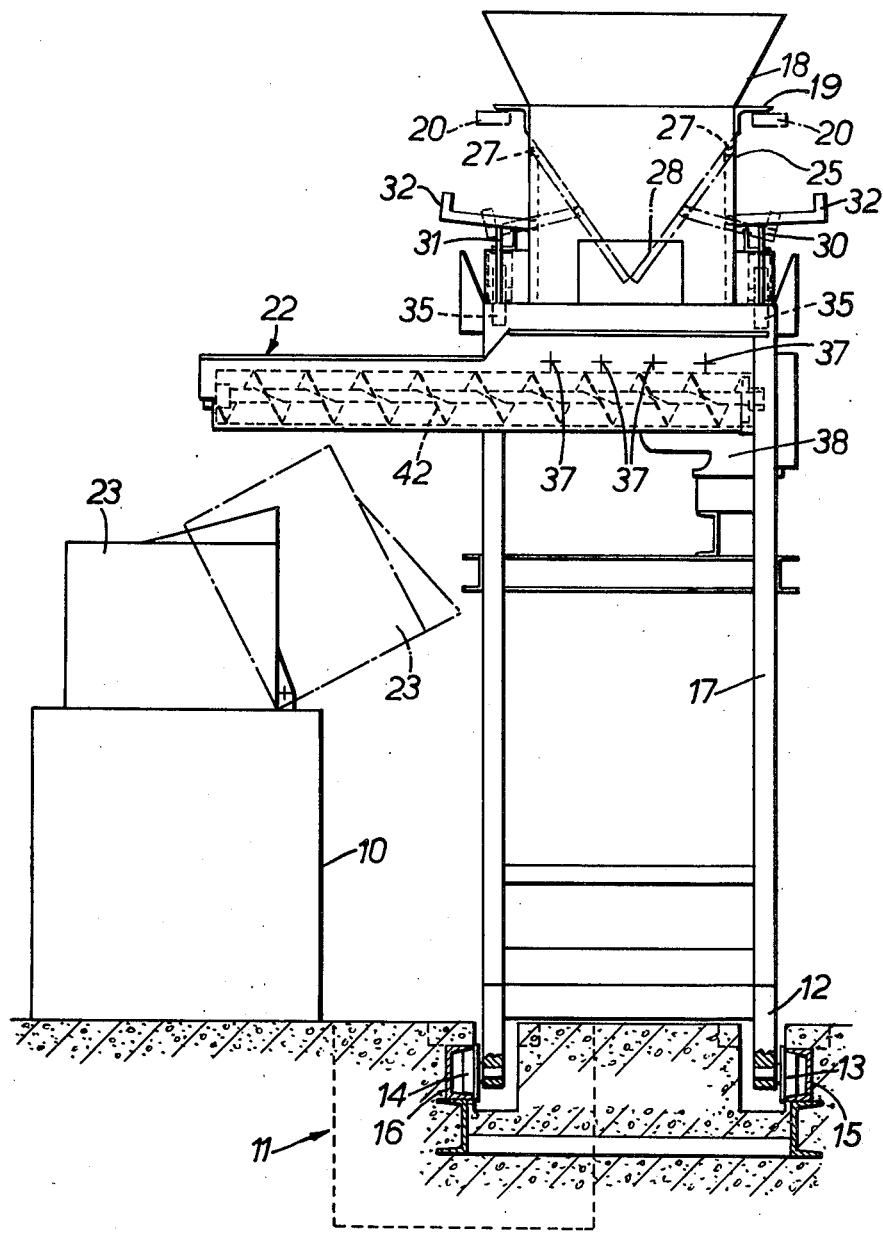
FIG. 1 is a side elevational view of a mechanized paste dispensing system in accordance with the invention for feeding paste to a pasting machine.
Figure 2:
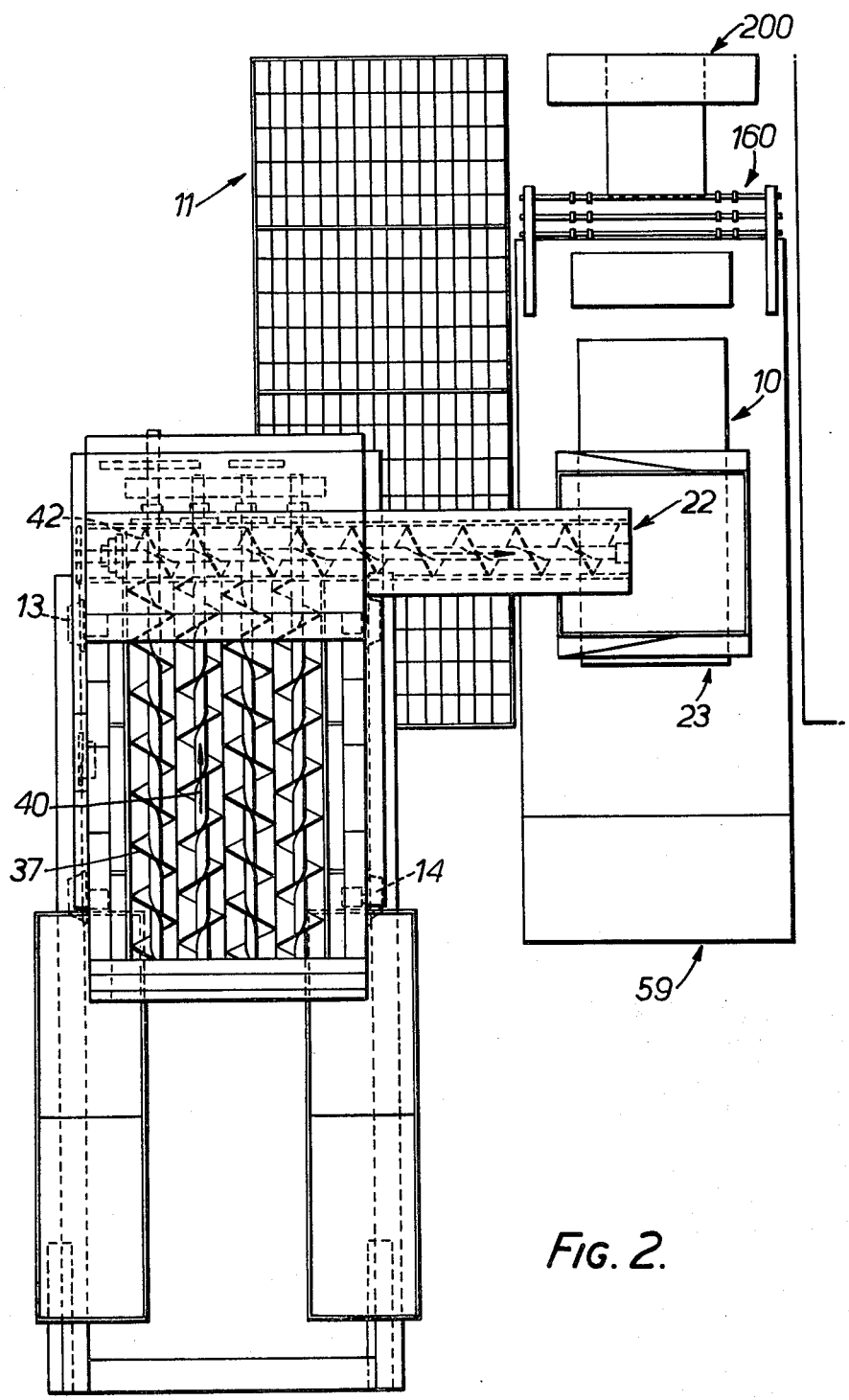
FIG. 2 is a plan view of the arrangement shown in FIG. 1.
Figure 3:
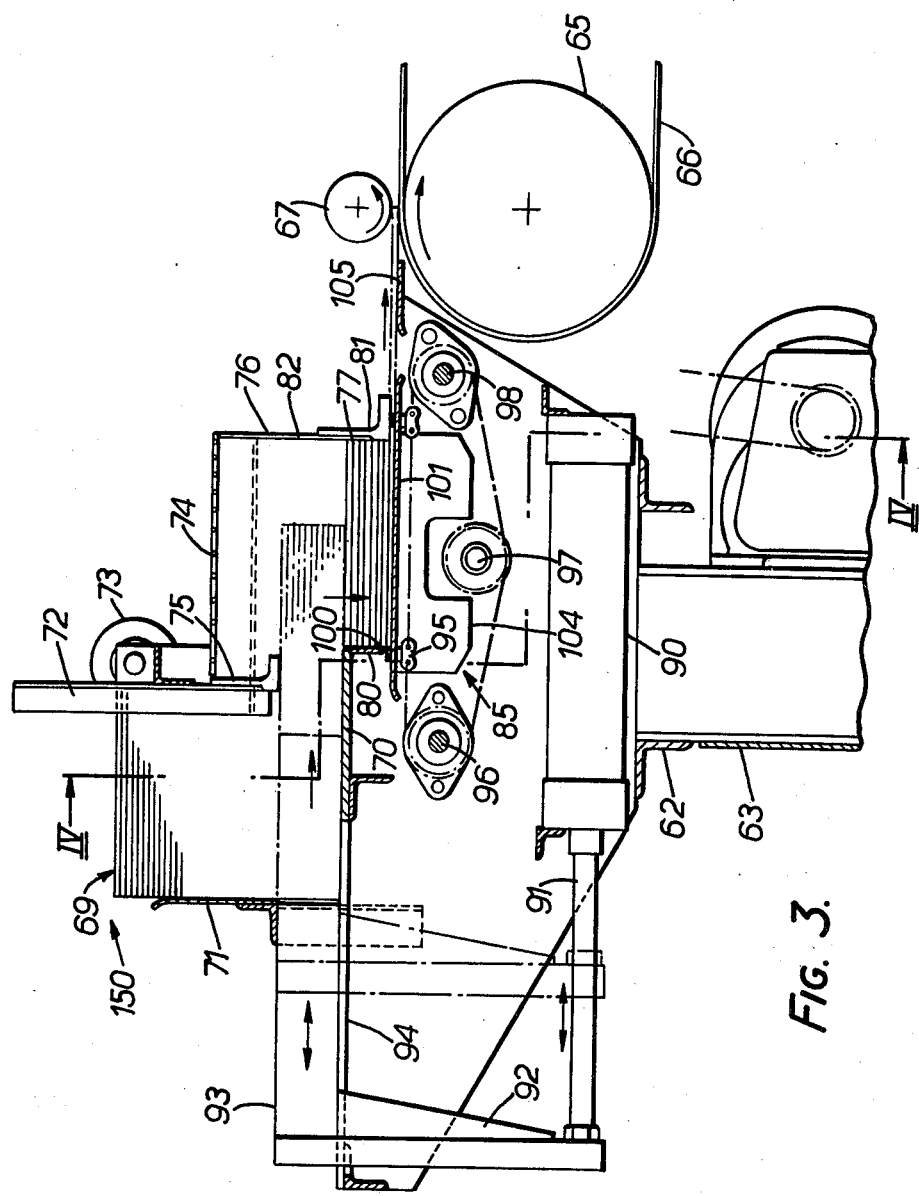
FIG. 3 is a side elevational view partly in section of a mechanized grid feeder in accordance with the invention for supplying grids to the pasting machine.

Referring to FIG. 2, the plant consists of a pasting machine 10 having a paste inlet hopper 23 which is fed with paste by a novel transportable kibble 18 (see FIG. 1) the paste being conveyed from the kibble, while it rests on a tower 17, by a novel screw conveyor 22. The kibble 18 once emptied is removed to the paste machine and refilled and its place on the tower is taken by a new full kibble.

The pasting machine is supplied mechanically with grids by a novel grid feeder 59 which is located at the inlet side of the machine's grid conveyor belt. The grids are pasted in a conventional manner and pass through to a drying oven 200. Paste deposited on the belt between the grids is recovered by a paste recovery mechanism 160 (see FIG. 5) and fed back to the hopper 23.

FIG. 1 is a side elevational view of the kibble, the support and outfeed conveyor mechanism taken along the line of the pasting machine and the drying oven. FIG. 2 is a top plan view of the arrangement shown in FIG. 1 showing the pasting machine and the inlet end of the drying oven.

The paste supply arrangement is mounted to the rear, from the operators point of view, of the pasting machine 10, in channels 15 and 16 below ground level above the sump 11. The support for the kibble consists of a lower trolley 12 having outwardly disposed rollers 13 and 14 on either side which run in the channels 15 and 16. On the top surface of trolley 12 there is a detachably mounted a tower 17 on which the kibble and its outfeed conveyor mechanism are themselves detachably mounted. The kibble indicated generally at 18 is provided with outwarding extending flanges 19 appropriately spaced for engagement by the forks 20 of a fork lift truck.

Below the kibble is the outfeed conveyor mechanism indicated generally at 22, which extends from the top of the tower out over the pasting bucket 23 of the pasting machine 10. The hopper 18 has rectangular end support walls 25 and inclined inner bottom walls 26 forming a V-shape, and hinged from the top at 27 to provide a displacable bottom portion 28 on each side of the V-shaped arrangement.

The conveyor mechanism 22 remains attached to the top of the tower although it can be demounted for maintenance. The paste hopper is used by being conveyed by fork lift truck to a paste mixer as soon as it is empty and filled with a load of paste and then conveyed back and positioned on top of the feed conveyor mechanism 22.

When lowered the paste hopper engages upstanding pegs 30 and 31 disposed at each corner of the hopper. These pegs operate a lever mechanism 32 which allows the base portions 28 which form the inclined bottom wall of the kibble to separate and attain a vertical position.

The bottom of the demountable kibble also has wheels 35 at each corner to enable it to be manhandled along the ground if necessary. The outfeed conveyor mechanism 22 consists of four flights of screw conveyors 37 rotating in semicircular channels with their top surfaces open to the bottom of the kibble 18 and with their axes disposed parallel to the apex of the V-shaped bottom wall. These conveyors are driven by a motor 38 located below the mechanism 22. These four conveyors are rotated so as to drive the paste towards the output end as indicated by the arrow 40 as indicated in FIG. 2.

The paste thus emerging from the ends of the flights 37 enters into a transverse flight 42 which is driven by a motor located below the motor 38 but not shown in FIG. 1.

The semicircular channels, the flights of the conveyors 37 and 42 and the inside surfaces of the kibble 18 are all coated with a friction reducing material, such as polytetra fluoroethylene, to reduce the tendency of paste to stick in the arrangement and to facilitate cleaning at the ends of shifts.

The tower and its associated trolley 12 can be moved along the length of the pasting machine so as to be withdrawn so as to enable paste which has gone into the sumps 17 to be retrieved periodically for reuse. As explained above the tower 17 can be demounted from the trolley 12 in case repair or servicing is needed for its associated mechanisms and the conveyor 22. If repair is needed for the trolley 12 it can be easily lifted out of the channels via gaps formed in the upper flanges of the channel sections 15 and 16 and disposed at the withdrawn position when the tower itself is clear of the end of the pasting machine.

Mechanism 59 is mounted on a light fabricated framework 60 consisting of side pieces 61 and a base plate 62 which is bolted to the main leg 63 of the pasting machine. This permits the device to be readily demounted from the machine for maintenance or cleaning, or repair. FIG. 3 shows the inlet drive drum 65 around which the pasting machine belt 66 runs, an idler roller 67 being positioned above the centre line of the drum 65. The framework carries a top storage table 70 on which a storage stack of grids or main magazine 69 is located and is defined by a back plate 71 and two front stop plates 72 of right angle shape located at each front corner of the magazine. These plates 72 are adjustably mounted on the side frame 61 by locking nuts 73.

The two front stop plates 72 are independently adjustable so that the centre of the body of the plates can be made coincident with the centre line of the machine. This is necessary because the plates which can be pasted by this machine can be those which have only a lug at one end as well as those which have lugs at each end. A guide 75 is located just in front of the side cheeks 72 to define the number of plates which can be pushed through from the main magazine into the feed magazine and is adjustably secured the side cheeks 72. This guide 75 also carries a magnetic interlock for a finger guard 74 which extends over the top opening of a feed magazine 76 so that if this finger guard is opened the drive for the whole of the feed magazine is shut off. This is a necessary safety check to prevent attempted manual clearance of jams which could be most dangerous for the operators hands. The main table 70 just in front of the guide 75 has a well 80 in it which extends beneath the bottom of the feed magazine 76.

The front end of the magazine 76 and the well is defined by a further transverse guide or adjustable end plate 81 which is supported on slots on the front face 82 of the feed magazine 76 which itself is supported by the side frames 61. Beneath the open bottom of the well 80 there is positioned a feed conveyor mechanism indicated generally at 85. A reciprocating grid transfer mechanism consisting of a selector operated cylinder 90 is located below the feed mechanism 85. The cylinder 90 is connected via its output piston 91 which is secured via a vertical reinforced bar 92 to a grid selector block 93. The thickness of the block 93 can be adjusted by securing top plates of varying thickness to its top surface by means of recessed screws. The bar 92 extends up through a slot 94 in the base plate. The grid selector block slides over the top surface of the base plate 70 and beneath a rearward extending flange carried on the back plate 71 of the rear magazine.

Returning now to the feed conveyor 85, this consists of three sprockets 96, 97 and 98 over which are directed a chain 95. There is a chain on either side of the conveyor mechanism, these being located at 8" centres. The front sprockets 98 are driven on each side. The lower sprockets 97 are adjustable tensioning sprockets and the rear sprockets 96 are idler sprockets. The chain carries transverse flights 100 on either side, again spaced at 8" centres, and these flights extend up outside a central base plate 101 which is disposed between the two chains and is supported on the mounting for the sprockets, which themselves are supported on brackets extending up from the base plate 62 of the side frame.

Figure 4:
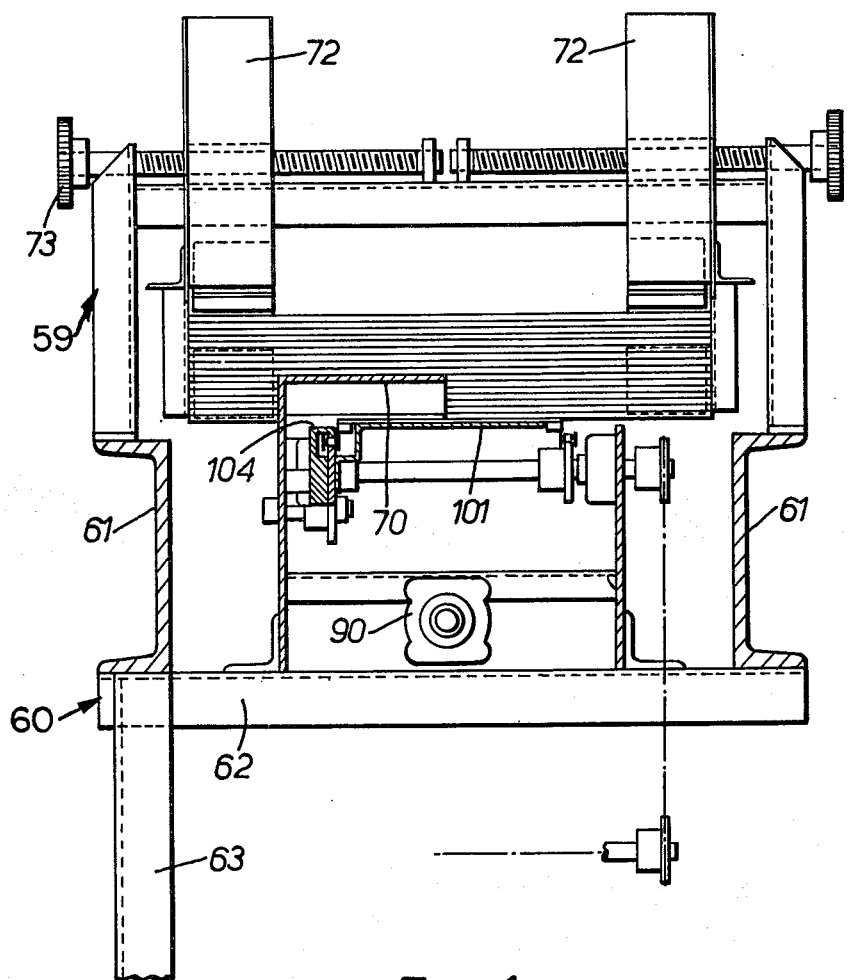
FIG. 4 is an end elevational view of the arrangement shown in FIG. 3 looking towards the pasting machine and taken on the line IV—IV of FIG. 3.

In order to prevent the chain rocking as soon as the flight which it carries engages a grid, the chains are carried through the top run of the loop in a cage 104 as shown best in FIG. 4. The cage 104 extends the full length of the bottom opening of the well 80 so as to support the chain over the full distance over which it is placed under stress and is adjustable so as to allow for wear.

Downstream of the drive sprockets 98 there is a further support plate 105 beneath the path of the grids, and this plate is attached to the side frame 61. A roller operated electrical microswitch is fitted at this point to detect overfeeding, e.g. two plates being delivered in overlying relationship.

The operation of the device is as described hereinbelow: The main magazine 69 is loaded with anything between 80 and 150 plates depending on the thickness of the plates. The conveyor mechanism 85 is started, it being interlocked with the belt drive mechanism for the pasting machine. The circuitry includes an interlock for the finger guard for the feed magazine and the grid selector block 93 is only operable once this interlock is closed. Once this is done the operator can select the starting phase for the grid feed mechanism and the selector cylinder 90 will retract the grid selector block 93 allowing a predefined number of plates to fall down to the bottom of the main magazine and will then return the grid selector block to push these plates through into the feed magazine where they then fall into the well 80. They are conveyed one by one through the agency of the mechanism 85 beneath the guides 81 and on to the belt of the pasting machine.

The well of the magazine can carry, for example, 8 plates of the size involved and the guide 75 is adjusted to allow 12 plates through so that the grid selector block will normally push through 12 plates. A pneumatic limit switch 77 in the magazine 76 detects when there are only 8 plates left in the magazine 76 and reactivates the cylinder 90 to repeat the transfer by the grid selector block from the main magazine to the feed magazine. The cycle proceeds continuously, the operator merely needing to load further plates into the main magazine when needed through the access region 150. The machine can be run at speeds of up to 120 plates per minute and with the main magazine being able to contain 80 to 120 plates, this means that at the most, the machine operator only has to reload the main magazine every half minute and in practice probably only needs to reload it once a minute. This reduces operator fatigue and allows higher productivity.

Figure 5:
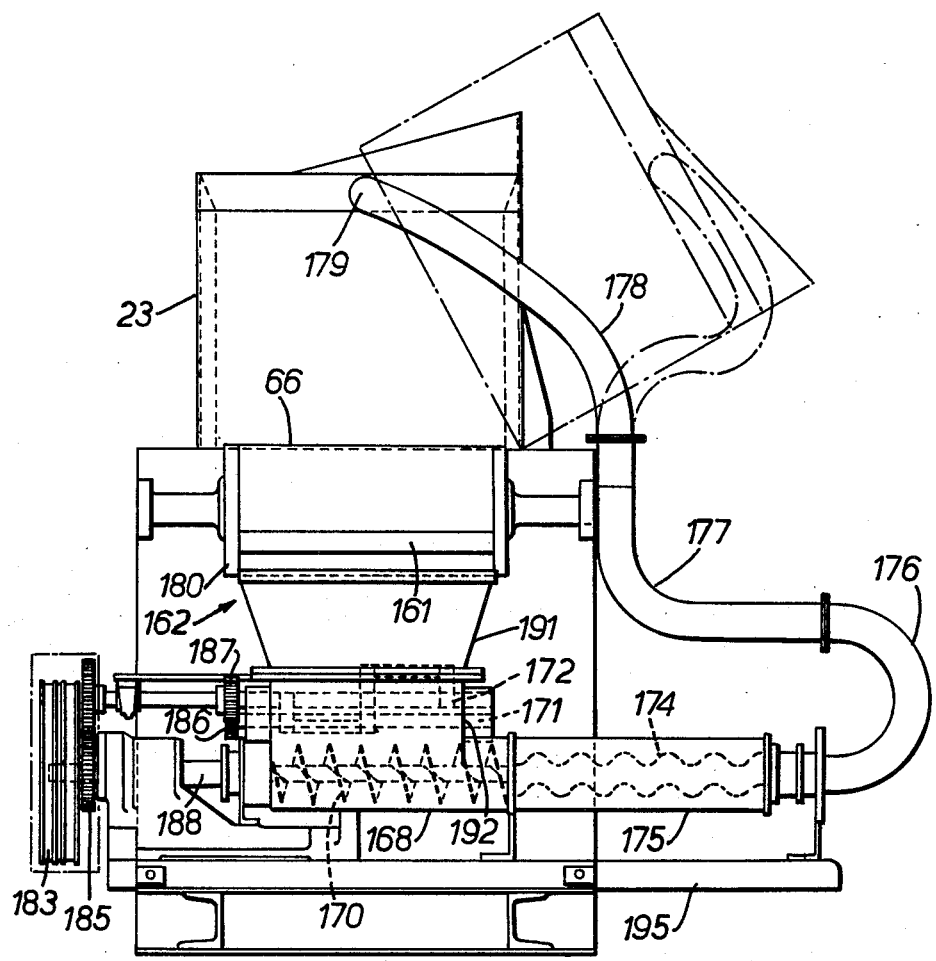
FIG. 5 is an end elevational view of a paste recovery system in accordance with the present invention shown looking towards the pasting machine from the drying oven.
Figure 6:
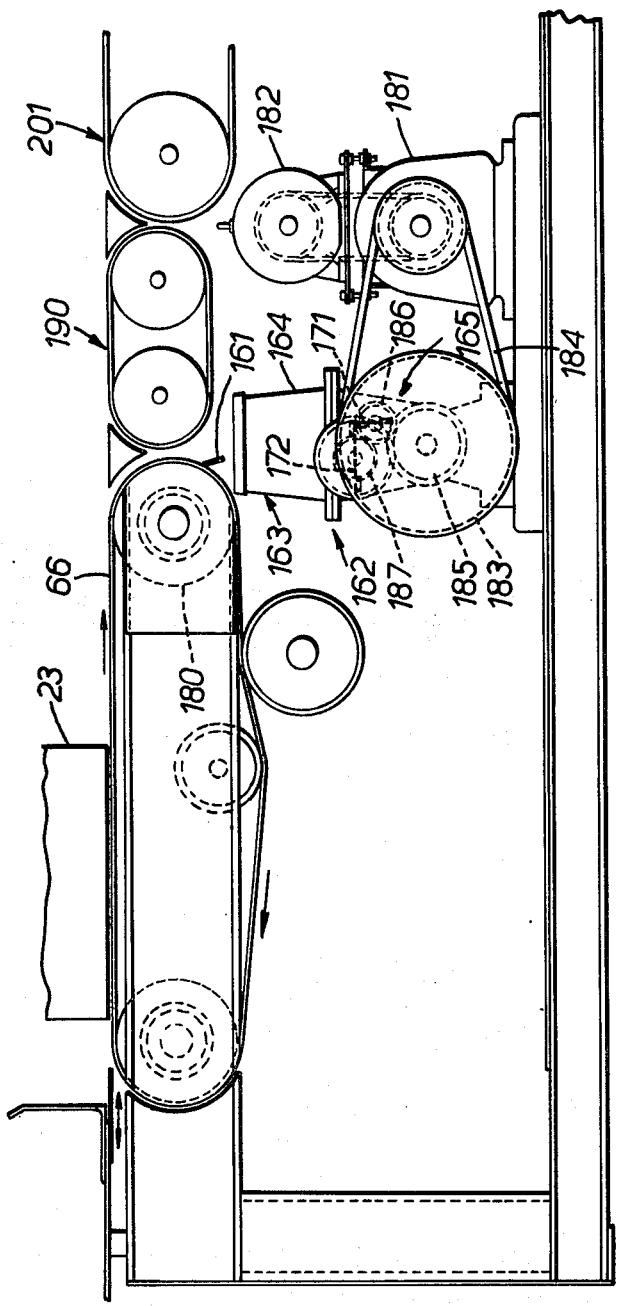
FIG. 6 is a fractional side elevational view from the operators side of the machine, of the arrangement shown in FIG. 5, showing the conveyor belt of the pasting machine and the drive arrangements for the paste recovery system.
Figure 7:
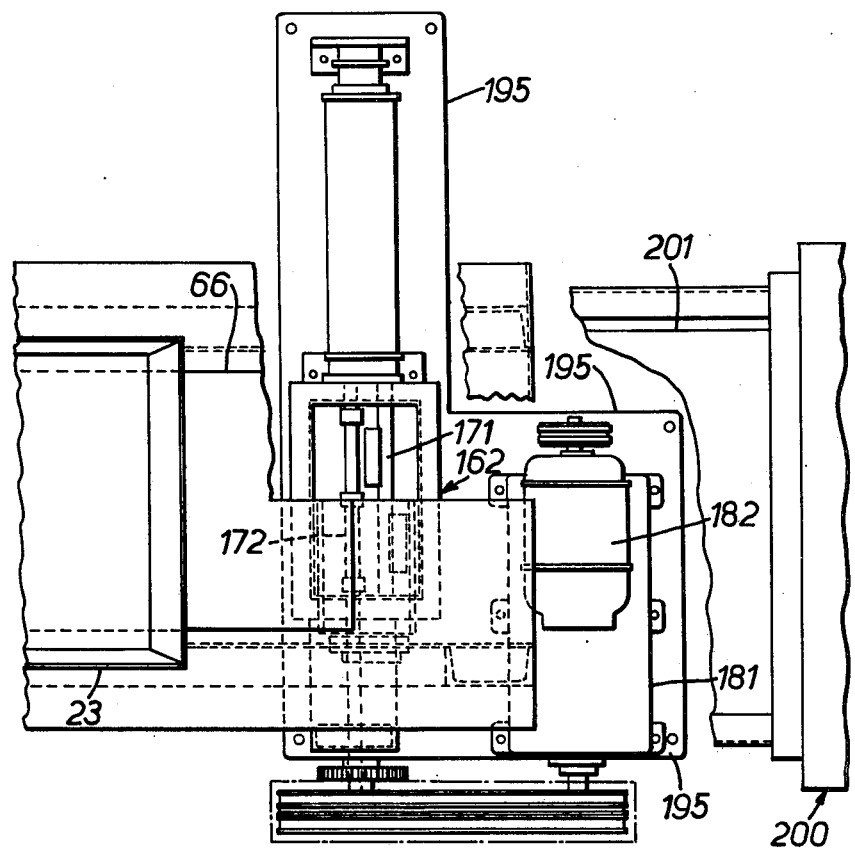
FIG. 7 is a top plan view of the arrangement of FIGS. 5 and 6, parts thereof being cut away to reveal the paste recovery arrangement.

The paste recovery system 160 is shown in FIGS. 5, 6 and 7.

The battery plates as mentioned above pass under the pasting machine bucket 23 and have paste applied to them. They then pass along the conveyor 66 over an intermediate conveyor 190 shown diagrammatically in FIG. 6 and onto the conveyor 201 of the drying oven 200.

The ribbons of paste between the plates pass around the roller 180 and are separated from the belt 66 by a scraper blade 161 which bears against the roller 180 and fall into the open top of a hopper 162. This hopper has an upper portion 163 with side walls 164 diverging outwardly from their top edge downwards and end walls 191 converging inwardly and a lower portion 165 with vertical end walls 192 and side walls 166 converging inwardly from their top ends and which run into the circular bottom wall of a first lower chamber 168 which contains a screw conveyor 170.

A pair of intermeshing paddles 171 and 172 are located in the upper portion 163 of the hopper 162, and rotate inwardly towards each other so as to feed the paste down towards the screw conveyor 170.

This is directly connected to the rotor 174 of a monopump 175 and the flights of the screw conveyor are such as to overfeed the monopump by about 10%. The output from the monopump passes around a substantial radius non flexible wide pipe bend 176 to an L shaped large radius bend 177 and thence to a reinforced flexible hose 178 which is connected to an inlet 179 at the central top edge of the bucket 23 of the pasting machine.

The paste recovery mechanism is driven via a heavy duty variable speed gear 181 by an electric motor 182. The output of the gear is connected to a large diameter drive wheel 183 by a belt drive 184 and a gear wheel 185 at the centre of the drive wheel meshes with two pinion wheels 186 and 187 which drive the paddles 171 and 172 respectively. The main drive wheel 183 is connected directly to the drive shaft 188 of the screw conveyor 170 which itself is directly connected to the rotor 174 of the monopump 175.

The paste recovery mechanism is preferably mounted on a separate bed plate 195 so that it can be pulled out from underneath the pasting machine without disturbing the pasting machine itself, if it needs maintainence or repair.

What is claimed as new and desired to be secured by Letters Patent of the United States is:

1. Plant for pasting battery plates comprising:
   grid feeding means having an outlet path, first flat conveyor means having an inlet end and an outlet end and a drive motor, said grid feeding means being positioned so that said outlet path is juxtaposed to the inlet end of the flat conveyor whereby grids fed from the grid feeding means are deposited on the inlet end of the flat conveyor,
   paste applying means having an inlet for receiving paste and an outlet for forcing paste into a grid conveyed on the conveyor past the said paste applying means, said first flat conveyor and said paste applying means together constituting a pasting machine,
   a transportable hopper and mechanical discharge means for mechanically discharging paste into the inlet to the pasting applying means,
   second conveyor means having an inlet end and an outlet end,
   third conveyor means having an inlet end and an outlet end, the inlet end of the second conveyor being juxtaposed to the outlet end of the first conveyor, and the outlet end of the second conveyor being juxtaposed to the inlet end of the third conveyor,
   a drying oven, the third conveyor passing through the drying oven,
   paste recycling means having an inlet located below the outlet end of the first conveyor,
   a flexible outlet pipe connected to the inlet to the paste applying means, and
   pump means disposed between the inlet and the outlet of the paste recycling means, whereby the paste recycling means is adapted to mechanically collect paste applied to the first conveyor at regions between the grids and to convey it back to the inlet to the paste applying means.

2. Plant as claimed in claim 1 in which the mechanical discharge means comprises
   a tower, adapted to support the transportable hopper, positioned to one side of the first conveyor and moveable along the length thereof; the tower being provided at a level above the inlet to the paste applying means,
   an outfeed conveyor means extending parallel to the first conveyor and having an outlet end,
   a transverse conveyor having an inlet opening along its length which communicates with the outlet of the outfeed conveyor means, including a discharge outlet positioned at a level above the inlet to paste applying means and on a line parallel to a line passing through the inlet and parallel to the longitudinal axis of the first conveyor, whereby the tower can be positioned so that the discharge outlet is juxtaposed to the inlet to the paste applying means,
   drive means adapted to drive the outfeed and transverse conveyors, the transportable hopper further comprising a gated base and actuatable means for opening the gated base and putting the hopper into communication with the outfeed conveyor, and actuating means so located as to automatically actuate the gated base when the transportable hopper is placed on the tower.

3. Plant as claimed in claim 2 in which the outfeed conveyors consist of two or more screw conveyors extending across the full width of the base of the hopper.

4. Plant as claimed in claim 3 in which the angle of the flights of the screw conveyors to the longitudinal axis of the conveyor is at least 22°, and the pitch is 80% to 120% of the diameter of the screw.

5. Plant as claimed in claim 1 in which the grid feeding means comprise a continuously movable driven horizontal chain conveyor having upstanding bars or flights extending across it adjustable for both height above the surface of the conveyor and spacing along the conveyor.

6. Plant as claimed in claim 5 in which the grid feeding means comprises a storage surface over which a grid selector block, adjustable for thickness, is arranged to move reciprocably, adjustable storage magazine defining members positioned above the storage surface and over the path of the grid selector block, a feed magazine separated from the storage magazine by an adjustable stop plate, the gap between the bottom of the stop plate and the storage surface being arranged to be the same as the thickness of the grid selector block, a feed conveyor extending along the bottom of the feed magazine, the bottom of the feed magazine being positioned at a lower level than the storage surface, the distance between the bottom of the feed magazine and the storage surface being less than the distance between the storage surface and the bottom of the stop plate, the feed conveyor carrying spaced transverse flights adapted to engage the bottom grid in the feed magazine and convey it out of the feed magazine beneath an adjustable end plate.

7. Plant as claimed in claim 1 in which the paste recycling means comprises a collector for the ribbons of paste deposited on the conveyor between adjacent plates affording the inlet into which the paste falls under gravity during the return path of the conveyor and a scraper for removal of the ribbon of paste from the conveyor.

8. Plant as claimed in claim 7 in which the collector comprises a hopper having an open top which affords the inlet and paddles which feed the paste from the bottom of the hopper into a lower chamber and a screw disposed in said lower chamber which feeds the paste into the pumping chamber which then pumps the paste slowly back to the inlet of the hopper of the pasting machine.

9. Plant as claimed in claim 8 further comprising a rotor in the pumping chamber directly connected to the screw in the lower chamber, and is such as to overfeed the rotor by 5 to 15%.

10. Plant as claimed in claim 8 in which the pump includes a drive motor which is interlocked with the drive motor of the conveyor so that no pumping can occur unless the conveyor is moving.

11. Plant as claimed in claim 8 further comprising electrical interlock means to sense the position of the pasting machine hopper arranged so that if the hopper is swung up away from its operating position the interlock means inactivates the drive motor of the pump of the paste recycling means.

12. Plant as claimed in claim 1 in which the drying oven incorporates convection heating means and radiative heating means and a perforate heat resistant conveyor.

13. Grid feeding means for battery plates comprising:
a storage surface
a reciprocable grid selector block, adjustable for thickness, disposed over said surface for moving a plurality of grids,
adjustable storage magazine defining members positioned above the storage surface and over the path of the grid selector block comprising a back plate member, a first and second front stop plate and means for vertically adjusting said back plate member and said first and second front stop plates, a feed magazine, including an adjustable end plate, separated from the storage magazine by said adjustable first and second stop plates, the gap between the bottom of the first and second stop plates and the storage surface being arranged to be the same as the thickness of the grid selector block such that said grid selector block moves said plurality of grids through said gap into said feed magazine, a feed conveyor extending along the bottom of the feed magazine, the bottom of the feed magazine being positioned at a lower level than the storage surface, the distance between the bottom of the feed magazine and the storage surface being less than the distance between the storage surface and the bottom of the stop plate, the feed conveyor carrying spaced transverse flights adapted to engage the bottom grid in the feed magazine and convey it out of the feed magazine beneath the adjustable end plate.

14. Paste recycling means for battery pasting apparatus comprising:
a collector for the ribbons of paste deposited on the paste conveyor between adjacent plates into which the paste falls under gravity during the return path of the conveyor;
a scraper to achieve or assist in removal of the paste from the conveyor;
a pair of intermeshing paddles disposed below said scraper for receiving the paste from said scraper;
a screw conveyor disposed below said pair of intermeshing paddles for receiving the paste from said pair of intermeshing paddles; and
means connected to said screw conveyor for recycling the paste to the collector.

* * * * *